United States Patent
Hallik et al.

(10) Patent No.: US 10,118,648 B2
(45) Date of Patent: Nov. 6, 2018

(54) MOTOR VEHICLE REAR

(71) Applicant: GM GLOBAL TECHNOLOGY OPERATIONS LLC, Detroit, MI (US)

(72) Inventors: Matthias Hallik, Ruesselsheim (DE); Juergen Vollhardt, Ruesselsheim (DE); Florian van de Loo, Ruesselsheim (DE); Benjamin Gruber, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 119 days.

(21) Appl. No.: 15/413,102

(22) Filed: Jan. 23, 2017

(65) Prior Publication Data
US 2017/0210428 A1    Jul. 27, 2017

(30) Foreign Application Priority Data
Jan. 21, 2016    (DE) .................. 10 2016 000 605

(51) Int. Cl.
*B60J 7/00*     (2006.01)
*B62D 25/08*    (2006.01)
(Continued)

(52) U.S. Cl.
CPC .............. *B62D 25/08* (2013.01); *B60R 19/34* (2013.01); *B62D 25/04* (2013.01); *B62D 25/087* (2013.01);
(Continued)

(58) Field of Classification Search
CPC ..... G03B 19/04; G03B 2219/045; E21B 7/30; F16L 55/1658; G03G 15/23;
(Continued)

(56) References Cited

U.S. PATENT DOCUMENTS 4,950,031 A  *  8/1990  Mizunaga ............ B62D 21/152
                                                    293/155
4,973,103 A  * 11/1990  Imajyo ................... B62D 25/02
                                                    296/191
(Continued)

FOREIGN PATENT DOCUMENTS

DE    102010018470 A1    11/2011
DE    102013000637 A1     7/2014
(Continued)

OTHER PUBLICATIONS

Great Britain Patent Office, Great Britain Search Report for Great Britain Application No. GB1700537.2, dated Jul. 11, 2017.
(Continued)

*Primary Examiner* — Kiran B Patel
(74) *Attorney, Agent, or Firm* — Lorenz & Kopf, LLP

(57) ABSTRACT

A motor vehicle rear includes two longitudinal members, a trunk floor supported by the longitudinal members, a rear wall which adjoins the ends of the longitudinal members and which delimits a trunk opening at the bottom and D pillars which laterally delimit the trunk opening. Lower end sections of the D pillars extend at the height of the longitudinal members beyond outer sides of the two longitudinal members facing away from one another and are anchored on the longitudinal members.

12 Claims, 4 Drawing Sheets

(51) Int. Cl.
  *B60R 19/34* (2006.01)
  *B62D 25/04* (2006.01)
  *B62D 25/20* (2006.01)
  *B62D 27/02* (2006.01)
  *B62D 43/10* (2006.01)

(52) U.S. Cl.
  CPC ....... *B62D 25/2027* (2013.01); *B62D 27/023* (2013.01); *B62D 27/026* (2013.01); *B62D 43/10* (2013.01)

(58) Field of Classification Search
  CPC ...... B62D 25/087; B62D 21/152; B60J 7/145; B60J 7/20; B60J 7/202
  USPC ..................................................... 296/193.06
  See application file for complete search history.

(56) References Cited

U.S. PATENT DOCUMENTS

| | | | | |
|---|---|---|---|---|
| 5,611,592 A * | 3/1997 | Satou | ................ | B62D 25/087 296/203.04 |
| 6,293,617 B1 * | 9/2001 | Sukegawa | ............ | B62D 25/025 296/203.02 |
| 6,364,405 B1 * | 4/2002 | Kim | ................... | B62D 25/087 296/203.01 |
| 6,412,857 B2 * | 7/2002 | Jaekel | ................. | B62D 23/005 296/203.04 |
| 6,533,348 B1 | 3/2003 | Jaekel et al. | | |
| 6,824,204 B2 | 11/2004 | Gabbianelli et al. | | |
| 7,503,603 B2 * | 3/2009 | Braunbeck | ............. | B60R 19/34 293/133 |
| 8,007,032 B1 * | 8/2011 | Craig | ................. | B62D 25/025 296/187.12 |
| 8,011,718 B2 * | 9/2011 | Tsuyuzaki | ............. | B62D 25/08 296/193.08 |
| 8,282,146 B2 * | 10/2012 | Izutsu | .................. | B62D 25/087 296/187.11 |
| 8,398,157 B2 * | 3/2013 | Marquette | ............. | B62D 25/04 296/193.06 |
| 9,527,450 B1 * | 12/2016 | Bellis | ................... | B62D 65/024 |
| 9,745,001 B2 * | 8/2017 | Mildner | ............... | B62D 29/043 |
| 9,855,971 B2 * | 1/2018 | Daido | ................. | B62D 21/152 |
| 2004/0051345 A1 * | 3/2004 | Gabbianelli | .......... | B62D 21/11 296/203.01 |
| 2004/0066061 A1 * | 4/2004 | Engels | .................... | B60R 19/18 296/193.08 |
| 2004/0080188 A1 | 4/2004 | Igarashi et al. | | |
| 2004/0108754 A1 | 6/2004 | Igarashi et al. | | |
| 2014/0159428 A1 | 6/2014 | Katou et al. | | |
| 2017/0106909 A1 * | 4/2017 | Daido | .................... | B60R 19/02 |
| 2017/0174064 A1 * | 6/2017 | Shinoda | .................. | B60K 1/04 |

FOREIGN PATENT DOCUMENTS

| | | |
|---|---|---|
| EP | 1431164 A1 | 6/2004 |
| GB | 2131361 A | 6/1984 |
| JP | H10244963 A | 9/1998 |
| JP | H11180349 A | 7/1999 |
| JP | 2006218995 A | 8/2006 |
| JP | 2007296879 A | 11/2007 |

OTHER PUBLICATIONS

German Patent Office, German Search Report for German Application No. 102016000605.6, dated Aug. 4, 2016.

* cited by examiner

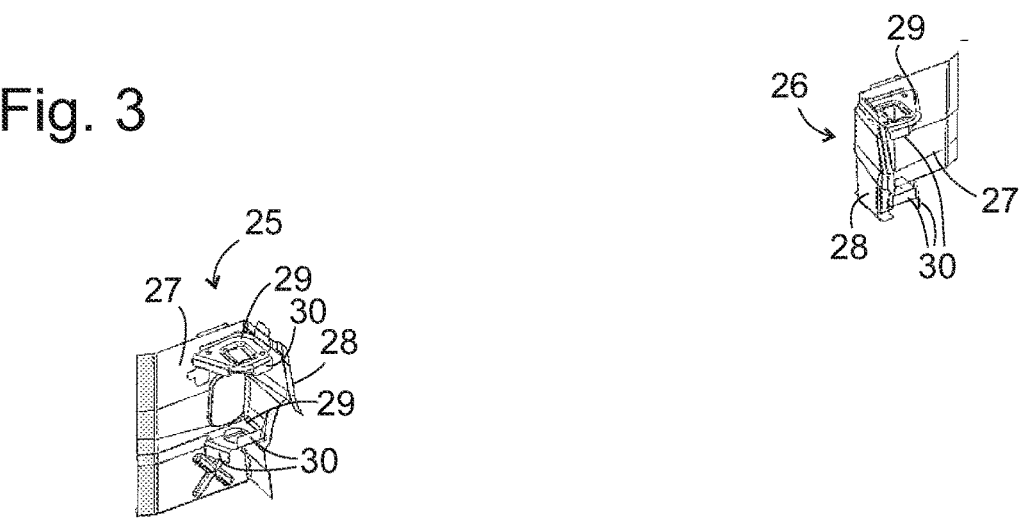
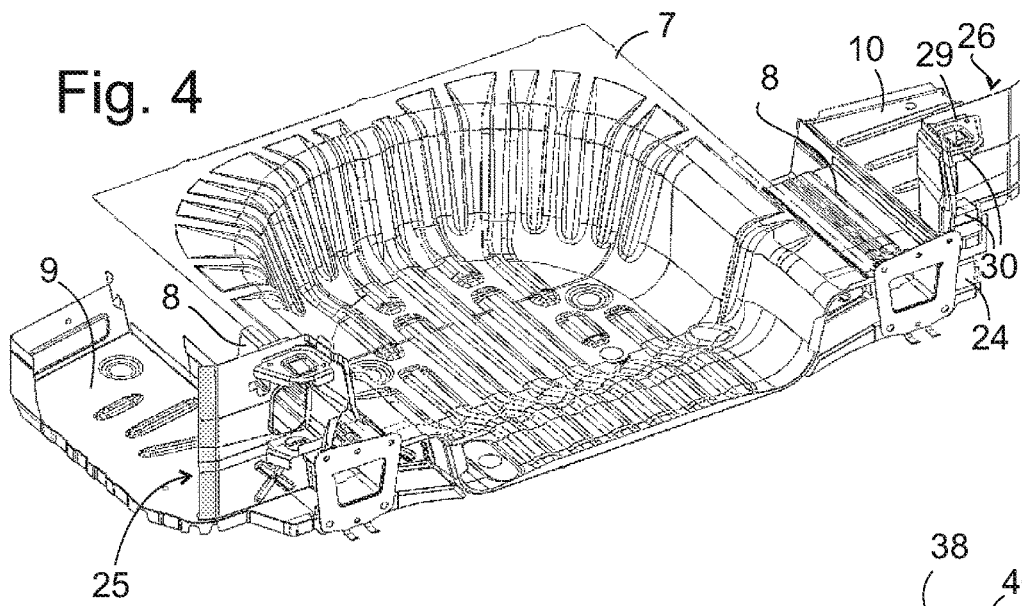
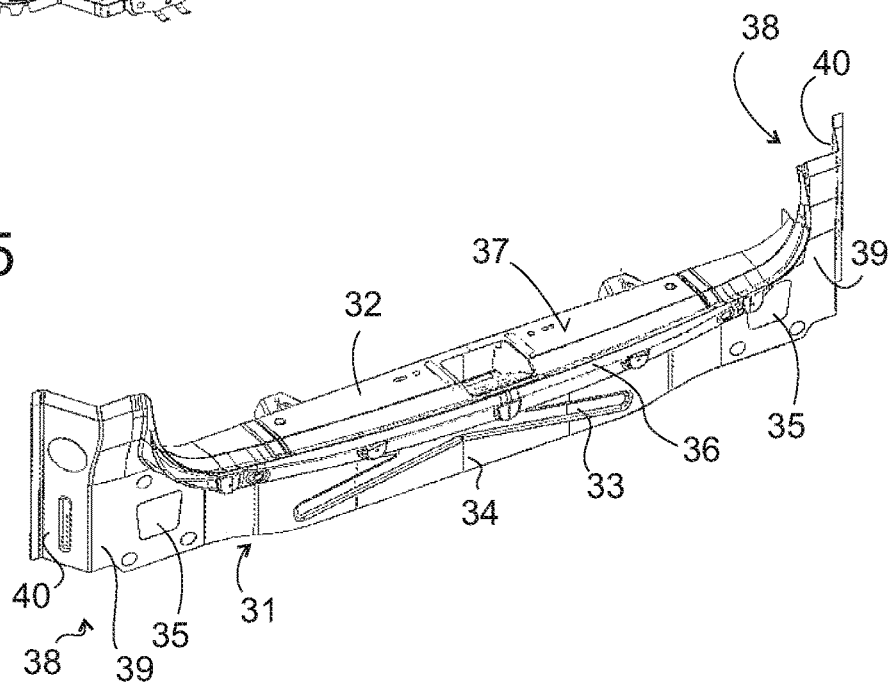

MOTOR VEHICLE REAR

CROSS-REFERENCE TO RELATED APPLICATION

This application claims priority to German Patent Application No. 102016000605.6, filed Jan. 21, 2016, which is incorporated herein by reference in its entirety.

TECHNICAL FIELD

The present disclosure pertains to a rear of a motor vehicle, in particular a rear with a steeply inclined trunk space flap in combined design.

BACKGROUND

D pillars as well as a loading edge which delimit a boot space or trunk space opening accommodating the trunk flap are conventionally designed as hollow profiles in order to ensure a sufficient dimensional stability of the trunk opening under the torsional stresses which occur during travel. Per se it is desirable to place the loading space as low as possible to facilitate the loading of loads into the boot or trunk. In so doing however, the problem arises that longitudinal members of the body which support the trunk floor, are lengthened at the rear ends by crash boxes which carry a bumper cross member. If the hollow profile of the loading edge were to be drawn down to between the rear ends of the longitudinal member and the crash boxes, this hollow profile would be exposed to a considerable risk of deformation in the case of a rear impact and the crash boxes would no longer fulfil the task ascribed to them of protecting the difficult-to-repair load-bearing components of the body from deformation in the event of a collision.

A conventional construction provides that the hollow profile of the loading edge runs above longitudinal members and crash boxes and is connected to the latter whereby a single sheet of the trunk rear wall engages between the ends of the longitudinal members and the crash boxes affixed thereto. The loading edge must therefore lie sufficiently high that the entire hollow profile has space above the longitudinal members. In addition, in order to achieve the necessary torsional stiffness, the hollow profile of the loading edge must go over with a large radius of curvature into the D pillars on both sides of the trunk opening, which has the result that loads which as a result of their width only just fit through the trunk opening must be raised considerably above the loading edge for loading in and out.

SUMMARY

The present disclosure provides a motor vehicle rear which achieves a high torsional strength with simple structure which can be produced efficiently and thereby allow more convenient load of heavy or cumbersome loads. An embodiment of the present disclosure provides a motor vehicle rear having two longitudinal members, D pillars which laterally delimit a trunk opening and adjoin the ends of the longitudinal members. Lower end sections of the D pillars extend beyond the longitudinal members from outer sides of the two longitudinal members facing away from one another and are anchored on the longitudinal members.

Since the D pillars are extended downwards and act directly on the longitudinal members, the loading edge can be largely relieved of torsional forces which occur during travelling. Thus, it is possible on the one hand to enlarge the trunk opening particularly downwards without adversely affecting the torsional stiffness of the body and on the other hand, the radius of curvature of a transition between the boot or trunk and the D pillars can be reduced which simplifies the loading and unloading of cumbersome freight.

In particular, the lower end sections, in precisely the same way as the upper parts of the D pillars, can be vertically oriented and anchored on the longitudinal members via the side walls thereof. The boundaries between structural elements of the motor vehicle rear such as the longitudinal members, the trunk floor or the D pillars need not coincide with the boundaries between individual components from which the motor vehicle rear is constructed. On the contrary, from the point of view of a simple and efficient production, structural elements can be composed of a plurality of components or one component can pertain to a plurality of structural elements. Thus, a plate of a rear wall delimiting the trunk opening at the bottom can include at least one lateral end section which extends in the lateral direction beyond the longitudinal members and forms a wall of one of the lower end sections of the D pillars. Preferably this lateral end section is angled in order to form both a rear and also an outside wall of one of the lower end sections.

An inner plate can be connected to the lateral end section in order to form a hollow profile of the D pillar. The inner plate is preferably also angled in order to form a front and an inside wall of the lower end section which delimits the load space opening so that the lateral end section of the rear wall and the inner plate are sufficient to form the aforementioned hollow profile of the D pillar.

For further stiffening, at least one bulkhead plate can be arranged in the hollow profile and fastened to the lateral end section and the inner plate. Since the edges of the bulkhead plate fastened to the lateral end section or the inner plate are only barely accessible, if the lateral end section and the inner plate are positioned on one another, the bulkhead plate is preferably fastened to at least one component selected from the lateral end section and the inner plate by adhesion. In order to make the connection between the lower end section of the D pillar and the longitudinal member, a lateral edge of the inner plate can be fastened to the outer side of the longitudinal member.

Alternatively, a lower edge of the inner plate can be fastened on an upper side of the trunk floor. The trunk floor can make an inherently stiff connection to the neighboring longitudinal member; preferably a reinforcing plate is provided which extends on the underside of the trunk floor in extension of the inner plate and is fastened to the outer side of the longitudinal member. A lower edge of this reinforcing plate is preferably connected to the rear wall. The rear wall can be formed as one wall, where however preferably an additional plate is provided which together with the rear wall forms a hollow profile extending along the loading edge.

BRIEF DESCRIPTION OF THE DRAWINGS

The present disclosure will hereinafter be described in conjunction with the following drawing figures, wherein like numerals denote like elements.

FIG. 3 shows two inner plates provided for mounting on the longitudinal members and the trunk floor;

FIG. 4 shows the inner plates mounted on the trunk floor and the longitudinal members;

FIG. 5 shows a rear wall of the motor vehicle rear;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
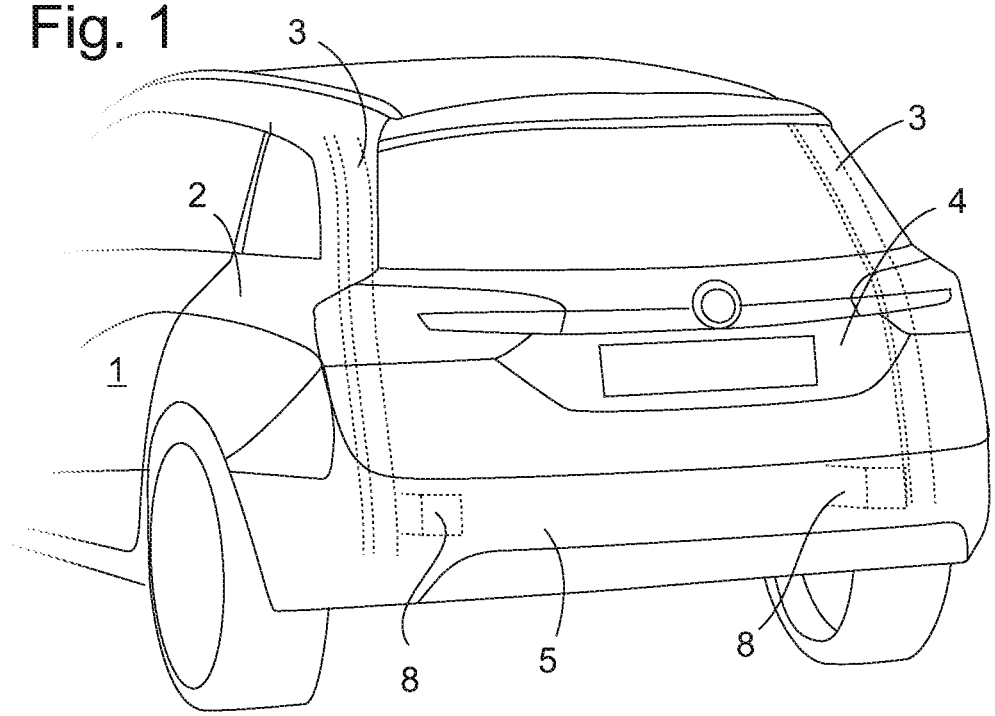
FIG. 1 shows a schematic view of a motor vehicle rear.

FIG. 1 shows the rear of a motor vehicle to which the present disclosure can be applied. A rear wing 2 adjoins a rear door 1 of the passenger compartment which is shown only in part. The rear wing 2 conceals a D pillar 3—indicated by the dashed line in FIG. 1—which delimits a trunk opening closed by a tailgate 4. A bumper cladding 5 extends below the tailgate 4.

Figure 2:
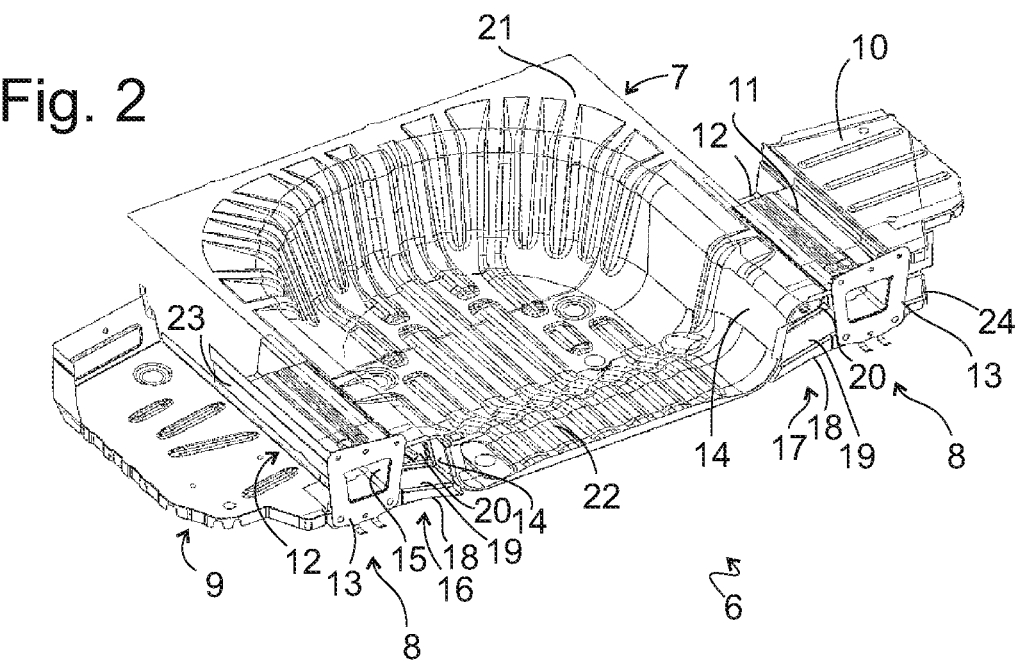
FIG. 2 shows a perspective view of longitudinal members and a trunk floor of the motor vehicle rear.

FIG. 2 shows the floor 6 of a boot space or trunk of the vehicle which is accessible via the tailgate 3. The trunk floor 6 is composed of a spare wheel well 7 which is formed in one piece from a sheet metal blank and which fills the space between two longitudinal members 8, the upper sides of the longitudinal members 8 and floor panels 9, 10 attached on the other side of the longitudinal members 8. The longitudinal members 8 are constructed in two parts in cross-section and include on the one hand a substantially flat upper profile 11 which in each case forms the upper side of the longitudinal member 8 and a lower profile 12, which is hat-shaped in cross-section, which is welded along its edges to the upper profile 11 in order to form a closed cross-section of the longitudinal member 8. The longitudinal members 8 extend over substantially the entire length of the vehicle and are generally formed from a plurality of consecutive blanks in the longitudinal direction, of which only the rearmost are shown in FIG. 2. Flanges 13 oriented perpendicular to the vehicle longitudinal direction on the rearward end of the longitudinal members 8 are provided in order to fasten a bumper cross member thereon by means of crash boxes not shown in the figure, which supports the bumper cladding 5.

Whereas a lateral and front edge region 21 of the spare wheel well 7 lies at approximately the same height as the upper profile 11 of the longitudinal members 8, the floor 22 of the spare wheel well 7 lies somewhat lower than the underside of the lower profile 12. A reinforcing plate 16 or 17 is inserted between a side wall 14 of the spare wheel well 7 and an inner side 15 of the longitudinal member 8 opposite to this on both sides of the spare wheel well 7. The reinforcing plates 16, 17 include a vertical flange 18 which is flush with the flanges 13 and the rear edge of the spare wheel well 7, a horizontal leg 19 which extends forwards from the upper edge of the flange 18 and which connects the floor of the spare wheel well 7 to the lower side of the longitudinal member 8, and a vertical leg 20 which rises from a front edge of the horizontal leg 19 and is welded to the inner side 15 of the longitudinal member 8, the side wall 14 and the underside of the edge region 21 of the spare wheel well 7.

The left reinforcing plate 16 does not extend in the lateral direction outwards beyond the left longitudinal member 8. On the outer side 23 thereof, the floor panel 9 extends at approximately the same height as the horizontal leg 19 of the neighboring reinforcing plate 16. On the right side of the body, the floor panel 10 lies approximately flush with the upper profile 11 of the longitudinal member 8; here the stiffening plate 17 extends in the lateral direction beyond the right longitudinal member 8 and forms an extension 24 on the other side of the outer side 23 thereof, whose edges are substantially congruent with those of the floor panel 10 extending thereover.

FIG. 3 shows two components designated as inner plates 25 or 26 according to their subsequent installation position in the vehicle rear. The inner plates 25, 26 each have an angular shape with a front wall 27 relative to the longitudinal direction of the vehicle and an inside wall 28 which delimits a trunk opening on the finished vehicle. The angle is stiffened by two horizontal bulkhead plates 29. At the edges of the bulkhead plates 29 facing the inner plates 25, 26, angled flanges are welded onto the inner plates 25, 26. Flanges 30 are provided on the edges of the bulkhead plates 29 facing away from the inner plates 25, 26 in order to be able to be provided with an adhesive coating which is used for connection to a rear wall described in further detail subsequently.

The contour of the inside wall 28 of the left inner plate 25 is adapted in its lower half to the outer side 23 of the neighboring longitudinal member 8 in order to enable a stable welding to the outer side 23 thereof. Flanges provided for welding on the floor panel 9 extend on the lower edge of the front wall 27 in the perspective of FIG. 3 in the direction facing away from the observer and are therefore not visible.

FIG. 4 shows the inner plates 25, 26 in the state mounted on the floor panels 9, 10 and longitudinal members 8. The flanges 30 of the bulkhead plates 29 run approximately congruently with edges of the floor panels 9, 10 located thereunder and in the case of the right inner plate 26, of the extension 24.

FIG. 5 shows an assembly having a rear wall 31 and an additional plate 32. The rear wall 31 includes a substantially planar central section 34 stiffened by beading 33 which is delimited to the sides by openings 35 and upwards by a leg 36 which projects rearwards in the vehicle longitudinal direction. As can be identified in particular by means of the cross-section in FIG. 11, the leg 36 together with the additional plate 32 extending thereover which has an angular cross-section, forms a hollow profile. This hollow profile defines a loading edge 37 of the vehicle rear. The loading edge 37 extends in the lateral direction beyond the openings 35. Lateral end sections 38 of the rear wall 31, sideways beyond the openings 35, each include a rear wall 39 which is substantially flush with the central section 34 in relation to the vehicle longitudinal direction and an outside wall 40 which is angled from the rear wall 39 towards the front, which projects over the loading edge 37.

Figure 6:
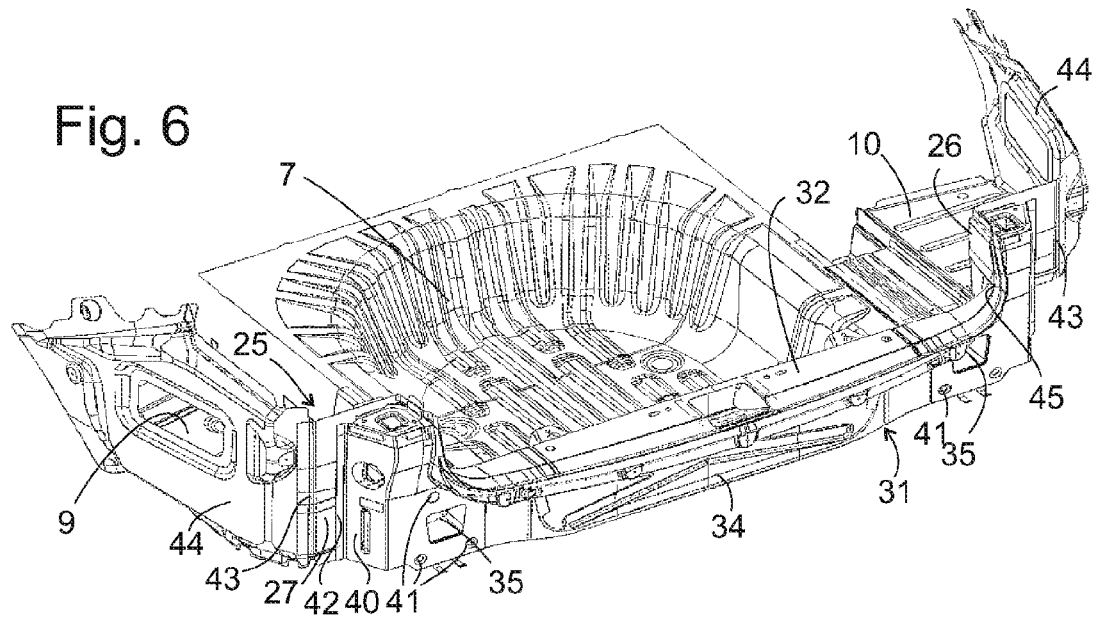
FIG. 6 shows the rear wall mounted on the assembly of FIG. 4.

FIG. 6 shows the assembly composed of rear wall 31 and additional sheet 32 in the mounted state. The central section 34 is welded along its lower edge to the rear edge of the spare wheel well 7. In the surroundings of the openings 35, the rear wall 31 abuts against the flanges 13 and bores 41 of the rear wall 31 and the flanges 13 are aligned with one another in order to enable the crash boxes to be screwed onto the flanges 13 in extension of the longitudinal members 8. The lateral end sections 38 are welded to the edges of the floor panels 9, 10, which are concealed here and the extension 24. The flanges 30 of the bulkhead plates 29 lying above the welded edges lie opposite the walls 39, 30 of the end sections 38 closely adjacent to one another and are connected to these whereby the adhesive applied to the flanges 30 is made to expand by the action of heat, typically during painting of the vehicle body. A flange 42 bent away from an outermost lateral edge of the outside wall 40 is welded on the front wall 27 of the inner plate 25 or 26. A vertical flange 43 again angled away at the outer edge of the front wall 27 is used to fasten a substructure 44 for the rear wing 2. The ends of the additional plate 32 which ascend towards the outside go over at an edge 45 in a continuous rounding into the inside walls 28 of the inner plates 25 or 26.

Figure 7:
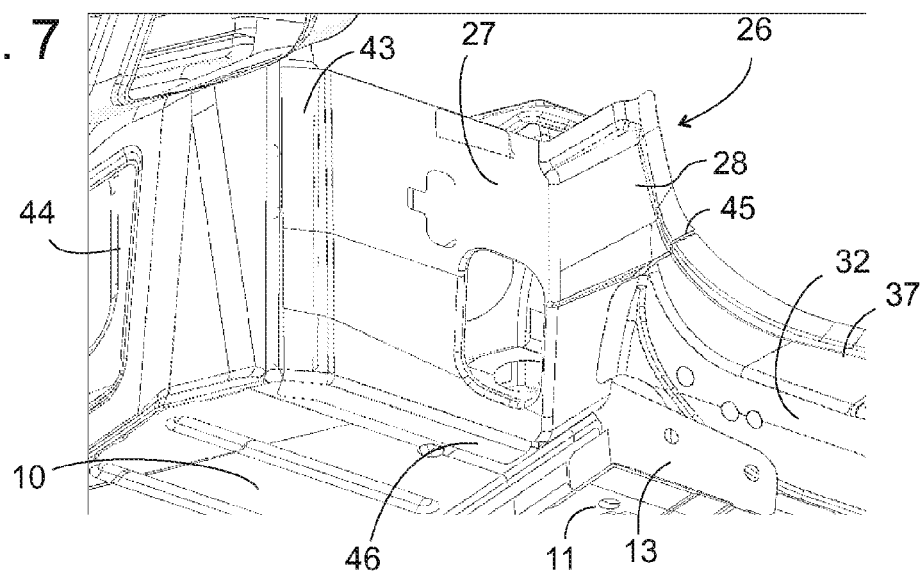
FIG. 7 shows one of the two inner plates seen from the boot or trunk.

FIG. 7 shows, when viewed from the boot or trunk, the inner plate 26 and its surroundings. The inner plate 26 extends downwards not beyond the upper profile 11 of the longitudinal member 8. The afore-mentioned flanges welded to the floor panel 10 around the lower edge of the front wall 27, here designated by 46, can be clearly seen. Not visible in the figure, the extension 24 of the reinforcing plate 17 extends under the floor panel 10 in extension of the front wall 27 of the inner plate 26.

Figure 8:
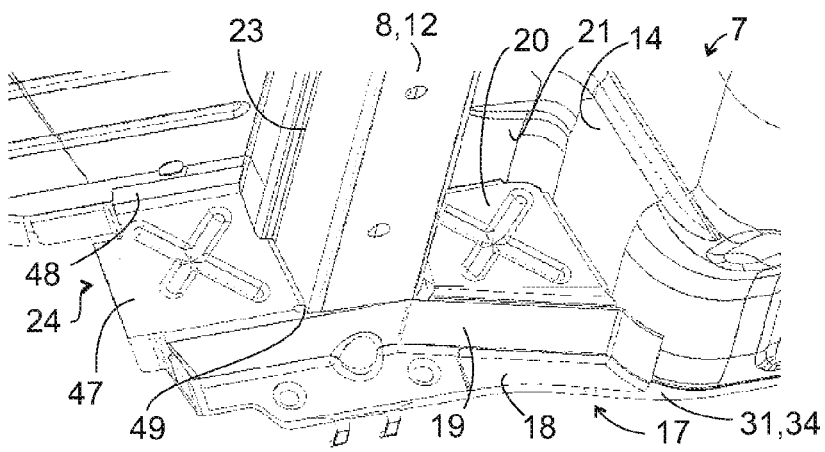
FIG. 8 shows a view of the trunk floor underneath the inner plate shown in FIG. 7 from below.

As shown in FIG. 8, the flange 18 and the horizontal leg 19 of the reinforcing plate 17 extend into the extension 24; in addition, the extension 24 includes a vertical leg 47 parallel to the vertical leg 20, which is welded by means of a flange 48 angled forwards at its upper edge on the floor panel 10 and via a flange 49 angled backwards on the outer side 23 of the longitudinal member 8. The vertical leg 47 extends in extension of the front wall 27 of the inner plate 26 and extends this to a certain extent through the floor panel 10 in order to thus form, together with the lower end of the right lateral end section 38 of the rear wall 31, the lower end of the right D pillar 4 anchored on the right longitudinal member 8.

Figure 9:
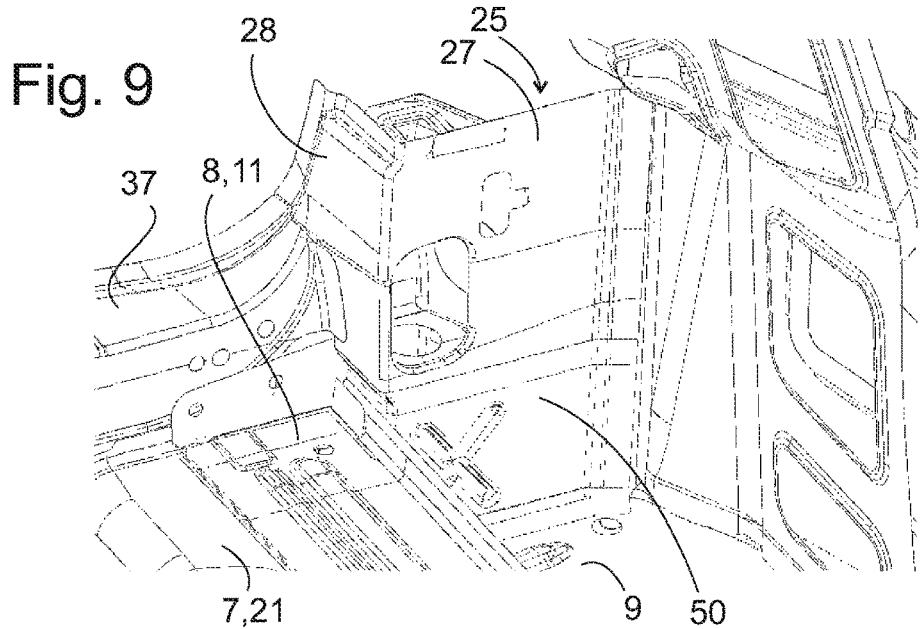
FIG. 9 shows a view of the other inner sheet seen from the interior of the boot or trunk.
Figure 10:
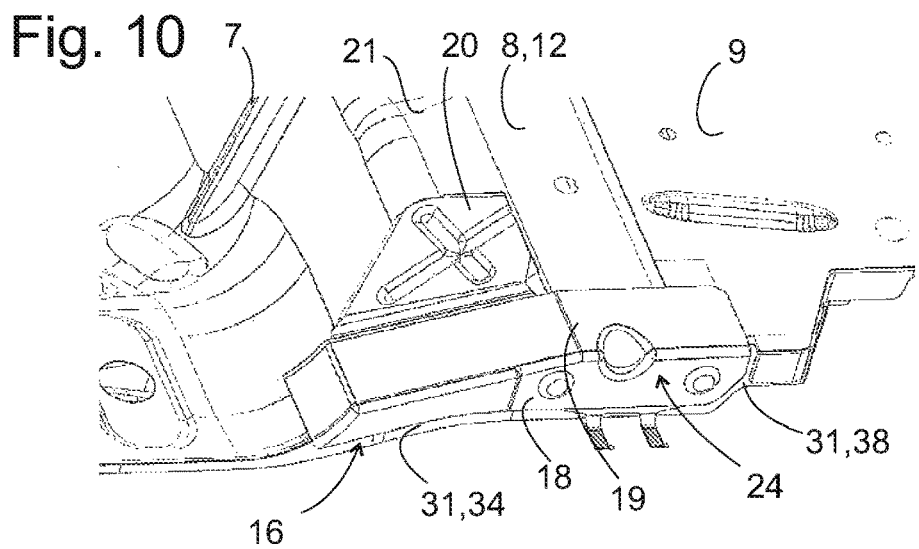
FIG. 10 shows a view of the trunk floor below the other inner plate from below.

FIGS. 9 and 10 show views similar to FIGS. 6 and 8 of the inner plate 25 or the reinforcing plate 16. Since the floor panel 9 lies deeper on the left side of the vehicle than on the right, the front wall 27 of the inner plate 25 has a lower section 50 which extends downwards beyond the upper profile 11 and is welded to the outside 23 of the longitudinal member 8 not visible in FIG. 9. The extension of the reinforcing plate 16 is shorter than that of the reinforcing plate 17 and merely includes a piece of the flange 18 and the horizontal leg 19.

Figure 11:
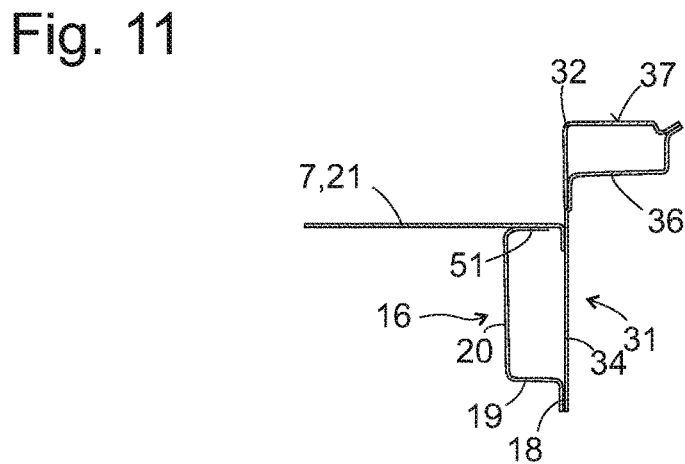
FIG. 11 shows a section through the rear wall.

FIG. 11 shows a section in the vehicle longitudinal direction through the lateral edge region 21 of the spare wheel well 7 and its surroundings. The rear wall 31 is welded on the rear edge of the spare wheel well 7. When viewed from the boot or trunk, this is largely concealed behind the additional plate 32. The flange 18 of the reinforcing plate 16 is welded on the lower edge of the rear wall 31; a flange 51 on the upper edge of the vertical leg 20 is connected to the underside of the edge region 21.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle rear comprising two longitudinal members, two D pillars laterally delimiting a trunk space opening and adjoining the ends of the longitudinal members, wherein each D pillar has a lower end section extending at a height of the longitudinal member beyond an outer side of the two longitudinal member facing away from one another and are anchored on the longitudinal members.

2. The motor vehicle rear according to claim 1, further comprising a rear wall delimiting the trunk space opening at the bottom, wherein the rear wall includes at least one lateral end section extending in the lateral direction beyond the longitudinal members and forming a wall of one of the lower end sections of the D pillars.

3. The motor vehicle rear according to claim 2, wherein the lateral end section is angled to form a rearward and an outside wall of the lower end section.

4. The motor vehicle rear according to claim 3, further comprising an inner plate is connected to the lateral end section to form a hollow profile.

5. The motor vehicle rear according to claim 4, wherein the inner plate is angled to form a front and an inside wall of the lower end section delimiting the trunk space opening.

6. The motor vehicle rear according to claim 4 further comprising at least one bulkhead plate arranged in the hollow profile and fastened to at least one of the lateral end section and the inner plate.

7. The motor vehicle rear according to claim 4, wherein a lateral edge of the inner plate is fastened to the outer side of the longitudinal member.

8. The motor vehicle rear according to claim 4, wherein a lower edge of the inner plate is fastened on an upper side of a boot space floor.

9. The motor vehicle rear according to claim 8, further comprising a reinforcing plate extending on an underside of a trunk space floor in extension of the inner plate fastened to the outer side of the longitudinal member.

10. The motor vehicle rear according to claim 9, wherein a lower edge of the reinforcing plate is connected to the rear wall.

11. The motor vehicle rear according to claim 2, wherein the rear wall consists of one wall.

12. The motor vehicle rear according to claim 11, wherein the rear wall and an additional plate form a hollow profile extending along the loading edge.

\* \* \* \* \*